US007836966B2

(12) United States Patent
McHugh et al.

(10) Patent No.: US 7,836,966 B2
(45) Date of Patent: Nov. 23, 2010

(54) FLOW SENSOR AND ACTUATOR

(75) Inventors: George J. McHugh, Berwyn, PA (US); George McHugh, IV, legal representative, Malvern, PA (US); George McHugh, IV, Malvern, PA (US); James P. McHugh, Berwyn, PA (US)

(73) Assignee: AGF Manufacturing, Inc., Malvern, PA (US)

( * ) Notice: Subject to any disclaimer, the term of this patent is extended or adjusted under 35 U.S.C. 154(b) by 313 days.

(21) Appl. No.: 12/010,637

(22) Filed: Jan. 28, 2008

(65) Prior Publication Data

US 2009/0188683 A1 Jul. 30, 2009

(51) Int. Cl.
*A62C 37/50* (2006.01)
*A62C 35/62* (2006.01)
*A62C 35/68* (2006.01)
*E03B 7/07* (2006.01)
*F16K 37/00* (2006.01)
*F17D 3/00* (2006.01)
*G01M 19/00* (2006.01)

(52) U.S. Cl. ............................ 169/91; 169/17; 169/23; 169/60; 169/61; 137/557; 239/71; 73/168

(58) Field of Classification Search ..................... 169/5, 169/16, 17, 23, 54, 56, 60, 61, 91; 239/67, 239/69, 71, 73, 211, DIG. 15; 73/168, 273, 73/430, 865.8, 865.9, DIG. 8; 137/553, 554, 137/557; 340/506, 606, 686.1
See application file for complete search history.

(56) References Cited

U.S. PATENT DOCUMENTS 4,741,361 A 5/1988 McHugh
4,852,610 A 8/1989 McHugh
4,971,109 A 11/1990 McHugh
4,995,423 A 2/1991 McHugh
5,103,862 A 4/1992 McHugh
5,320,138 A * 6/1994 Ferlitch, Jr. .............. 137/552.7
5,864,287 A * 1/1999 Evans et al. ................. 340/506

(Continued)

FOREIGN PATENT DOCUMENTS

GB 2280369 A * 2/1995

OTHER PUBLICATIONS

Tyco Fire Products Zonecheck®-Flow Switch Tester <<www.tyco-fire.com>> (2 pages).

*Primary Examiner*—Darren W Gorman
(74) *Attorney, Agent, or Firm*—Buchanan Ingersoll & Rooney PC

(57) ABSTRACT

An arrangement for testing a fire suppression sprinkler system includes a conduit for supplying a flow of fire suppression fluid to at least one sprinkler. A sensor is configured to sense the flow of the fire suppression fluid to the at least one sprinkler. The sensor has a first condition indicative of a predetermined volume of flow of the suppression fluid to the at least one sprinkler and a second condition indicative of a volume of flow of the fire suppression fluid to the at least one sprinkler less than the predetermined volume of flow. An actuator causes the sensor to be in the first condition or the second condition. A signaler provides an indication to a user that the sensor is in at least one of the first condition and the second condition.

14 Claims, 3 Drawing Sheets

U.S. PATENT DOCUMENTS 6,246,333 B1 * 6/2001 Doner et al. ............. 340/686.1
6,302,146 B1 10/2001 McHugh
2002/0014270 A1 * 2/2002 McHugh ................ 137/601.16

* cited by examiner

FLOW SENSOR AND ACTUATOR

BACKGROUND AND SUMMARY OF THE PRESENT INVENTION

The present invention relates generally to testing fire suppression fluid sprinkler systems, and in particular relates to testing flow sensors or flow switches that detect the flow of fire suppression fluid in conduits.

In a typical fire suppression water sprinkler system as installed in many buildings, an array of individual fire sprinklers is supplied with water through a main conduit and various branch conduits. The individual fire sprinklers are generally provided with a member that melts when the ambient temperature reaches a predetermined level indicative of a fire. The melting of the member opens a fire sprinkler to spray water in order to suppress the fire. The individual fire sprinklers are provided with meltable members so that the spray of water will hopefully be limited to the region of the building where the fire is present. In this way, the extent of water damage may be minimized.

Such fire suppression systems also oftentimes have a switch or sensor that detects the flow of water in the conduits to indicate that even only one of the individual water sprinklers has opened. Since the flow of water in the conduits generally means that a fire is present in the building, the switch or sensor typically triggers a fire alarm or sends an appropriate signal directly to a fire department. Therefore, many codes require, and it is generally otherwise desirable, that the switch or sensor which detects the flow of water in the conduits be periodically tested. Accordingly, it has also become conventional in the art to provide a valve which enables the system to be tested by permitting a flow of water corresponding to the flow through only one individual water sprinkler that has been opened.

Various valves and arrangements for testing and also for draining fire suppression systems are known in the art such as are shown and described in U.S. Pat. Nos. 6,302,146, 5,103,862, 4,971,109, 4,995,423, 4,852,610, 4,741,361 all of AGF Manufacturing, Inc. These patents are each incorporated herein by reference.

In the known valves and arrangements for testing fire suppression systems, the testing valve is operated manually with the inspector or maintenance personnel positioned at the testing valve. Being adjacent to the testing valve also permits the inspector or maintenance personnel to visually observe the flow of water through the testing valve through one or more sight glasses, if provided, or through the outlet of the testing valve if the outlet is not piped directly to a closed drain. Various arrangements also allow the testing valve to be operated remotely.

The main water conduit typically has a plurality of branch conduits including a number of sprinkler heads. Typically, a supply valve either for the entire fire suppression system or for a particular floor or for a portion or the system, is provided in the main water conduit. Downstream of the supply valve is the fire suppression fluid flow sensor which is configured to detect a flow through the conduit corresponding at least to the flow through a single sprinkler head.

The fire suppression fluid flows through the valves and various arrangement for testing fire suppression systems and is then directed to a drain and into the local waste water system. Although an individual test of a fire suppression fluid flow sensor may require 10 to 12 gallons, in a large multi-story building the testing procedure results in the use of a large quantity of water that is ultimately released into the waste water system. The provision of testing valves for each conduit also adds construction and maintenance costs.

The construction industry has increasingly recognized the environmental, economic and health and community benefits of providing so-called green buildings. The establishment of the leadership in energy and environmental design (LEED) Green Building Rating System™ recognizes that reducing water consumption provides environmental, economic and health and community benefits. These benefits include, for example, conserving natural resources, reducing operating costs, enhancing asset value and profits and minimizing the strain on local infrastructure.

In view of the above background information, it is an object of the preferred embodiments of the present invention to provide a testing arrangement by which a fire suppression system fluid flow sensor may be tested remotely, without the use of a flow of the fire suppression fluid.

A further object of the preferred embodiments of the present invention is to provide a testing arrangement by which a fire suppression system fluid flow sensor may be tested remotely economically and relatively easily.

It is another object of the preferred embodiments of the present invention to provide a testing arrangement by which a fire suppression system fluid flow sensor may be tested remotely using an electrically controlled solenoid switch.

It is another object of the preferred embodiments of the present invention to provide a testing arrangement by which a fire suppression system fluid flow sensor may be tested remotely using a pneumatically controlled switch.

The above objects as well as other objects not specifically mentioned are accomplished by an arrangement for remotely testing a fire suppression sprinkler system, in accordance with the present invention, whereby a sensor is configured to sense the flow of the fire suppression fluid to the at least one sprinkler. The sensor has a first condition indicative of a predetermined flow of the suppression fluid to the at least one sprinkler and a second condition indicative of a flow of the fire suppression fluid to the at least one sprinkler less than the predetermined flow. An actuator causes the sensor to be in the first condition or the second condition. A signaler provides an indication to a user that the sensor is in at least one of the first condition and the second condition.

In a preferred embodiment the sensor has a paddle that is placed in the main conduit to detect a flow of fire suppression fluid corresponding to at least the flow through a single sprinkler head.

In another preferred embodiment the actuator is configured as an electrically controlled solenoid switch.

According to another preferred embodiment the actuator is configured as a pneumatically controlled switch.

BRIEF DESCRIPTION OF THE DRAWING FIGURES

The preferred embodiments of the present invention will be described in greater detail with reference to the accompanying drawings, wherein like members bear like reference numerals and wherein.

DETAILED DESCRIPTION OF PREFERRED EMBODIMENTS OF THE INVENTION

Figure 1:
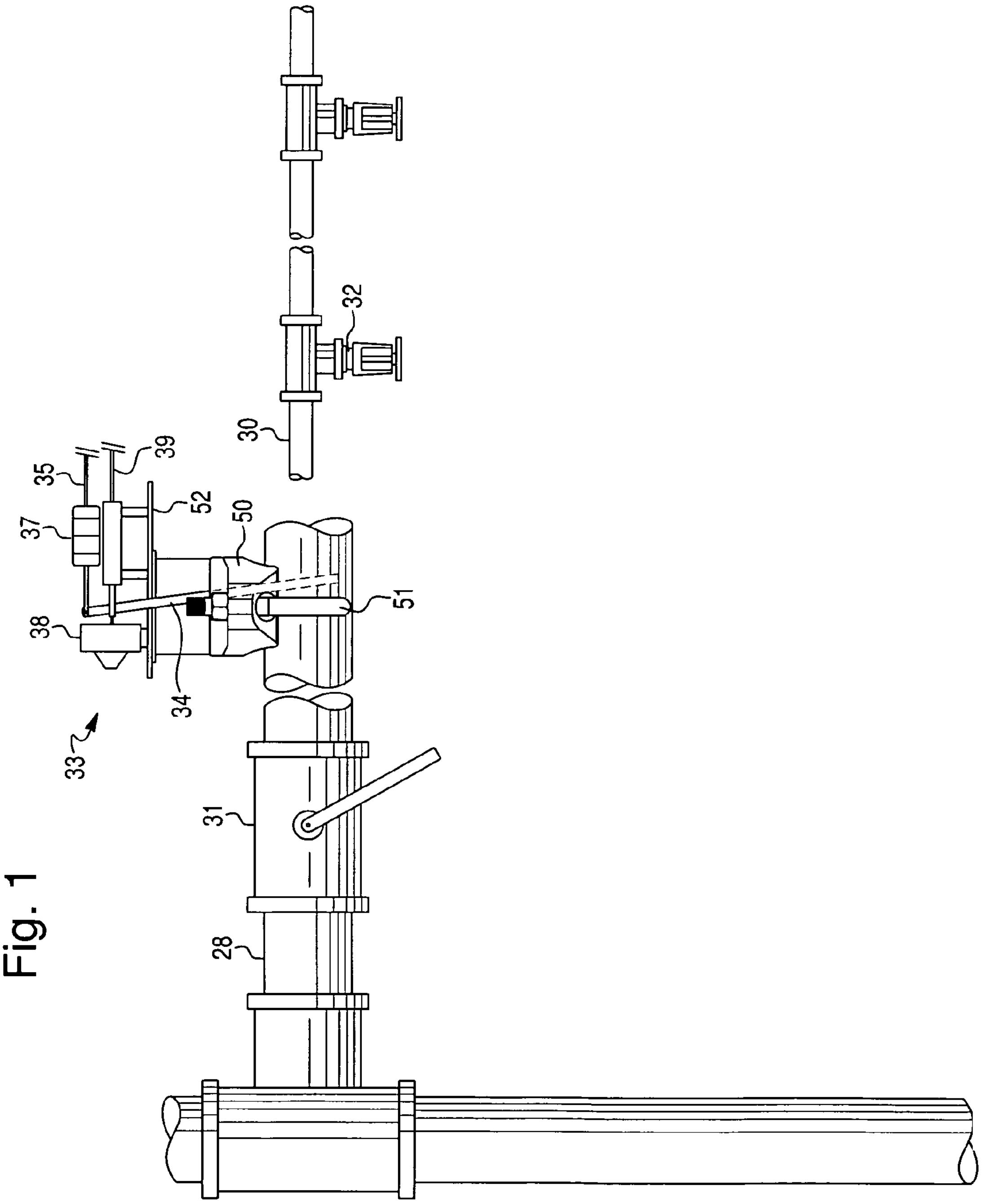
FIG. 1 is a side view of an arrangement according to a preferred embodiment of the present invention.

As shown in FIG. 1, a main conduit 28 for a fire suppression fluid such as water is provided in fluid communication with a plurality of branch conduits 30 including a number of sprinkler heads 32. Typically, a supply valve 31 either for the entire fire suppression system or for a particular floor or for a portion of the system, is provided in the main conduit 28. Downstream of the supply valve 31 is a flow sensor or switch 33 which is configured to detect a flow of fire suppression fluid through the main conduit 28 corresponding at least to the flow through a single sprinkler head 32.

Figure 2:
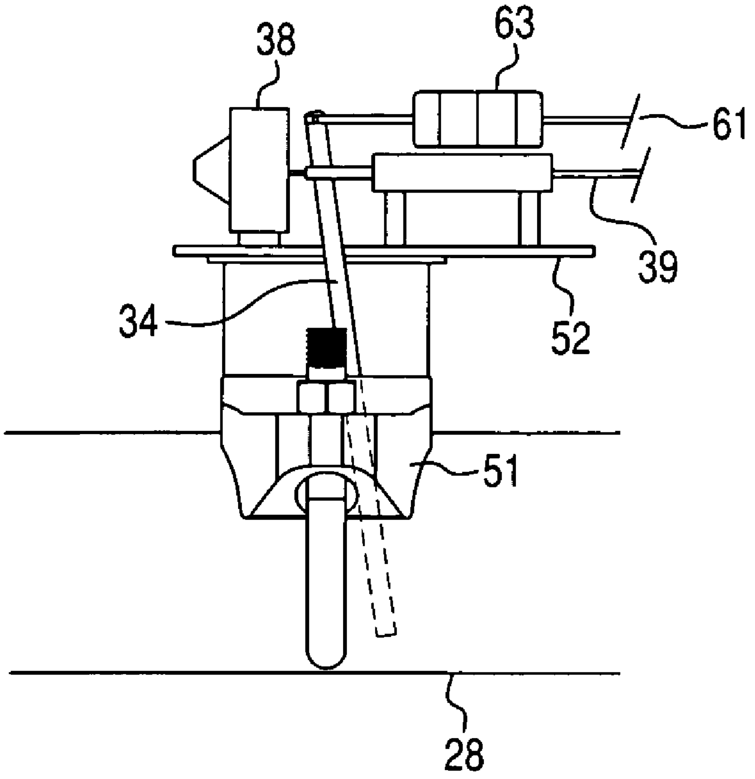
FIG. 2 is a side view of a flow sensor and an actuator according to a preferred embodiment of the present invention.

The flow sensor 33 detects the flow through the conduits to the sprinkler heads 32. This is accomplished by fluid flow pressure acting on a paddle 34 which is placed in the conduit. The flow of a fluid corresponding to at least the flow through a single sprinkler head 32 from left to right in FIG. 2, displaces the paddle 34 to the right as shown in FIG. 2, for example. In the absence of a fluid flowing corresponding to at least the flow of fluid through a single sprinkler head 32, the paddle is in a neutral position, for example, perpendicular to the axis of the conduit. The paddle 34 is linked to a trigger signal switch 36 through any suitable means, for example, through a mechanical linkage. When the paddle 34 is displaced by the flow of fluid, the displacement of the paddle 34 is detected, via the mechanical linkage, by the trigger signal switch 36. Damper 38 is provided to prevent the paddle 34 from being influenced by unintended movements caused by, for example, the condition known as water hammer. This ensures accurate positioning of the paddle 34 and prevents triggering false signals. The trigger signal switch 36 sends an alarm signal via signal line 39 or triggers a mechanical alarm to notify a user that fluid is flowing and that there may be a fire in the building. It should be appreciated by one of ordinary skill in the art that any suitable sensor may be used to detect the flow of fire suppression fluid so long as it is connected to the trigger signal switch 36 which in turn is able to send or trigger an alarm.

It is expected that periodic manual testing of the fire sprinkler system will be conducted either as a safety precaution or in compliance with local ordinances. The arrangement of the preferred embodiments of present invention permit the fire sprinkler system to be tested easily and conveniently without the flow of fire suppression fluid, which will in turn enable the fire sprinkler system to be tested more frequently without incurring significant cost or inconvenience.

According to the preferred embodiments, the sensor 33 may be tested remotely by actuating the sensor 33 without the flow of fire suppression fluid. This is accomplished by displacing the paddle 34 mechanically by using a remotely actuated solenoid 37. The solenoid 37 is electrically powered via power line 35. A user sends a signal to actuate the solenoid 37 to displace the paddle 34 via a mechanical linkage or other suitable means between the solenoid 37 and the paddle 34. The paddle 34 is displaced in the manner as if the flow of fire suppression fluid were acting on the paddle 34. The displacement of the paddle 34 is detected by the trigger signal switch 36 which in turn sends an alarm signal via signal line 39 or triggers a mechanical alarm to notify a user that the sensor 33 including the trigger signal switch 36 is operating properly. The use of the remotely actuated solenoid 37 eliminates the need for fire suppression fluid and testing valves during the testing of the fire suppression system.

The flow sensor 33 is mounted to the main conduit 28 via mounting clamp 50. Mounting clamp 50 may include, for example, a U-shaped clamp portion 51 which fixes the mounting clamp 51 to the main conduit 28. The mounting clamp 51 may include a fixing plate 52 which allows the sensor 33 including trigger signal switch 36, solenoid 37 and damper 38 to be mounted proximate to each other and to the main conduit 28. The fixing plate 52 may be provided separate from the mounting clamp 50 wherein the sensor 33 is mounted to the fixing plate 52 which in turn is fixed to the mounting clamp 50. Thus allows the sensor 33 to be removed without the necessity of removing the entire mounting clamp 50. A cover 53 shown in FIG. 2 may be provided to protect the sensor 33 from outside elements such as dust, impacts etc.

In this way, the fire suppression system may be tested from a remote location such as from a security guard's station or from a central control station without requiring anyone to go to the location of the sensor 33. Notice of the sensor's operation is provided to the remote location via an interface 40, such as a visual display, which provides the user with a notification that the sensor 33 is operating by triggering the alarm.

Figure 4:
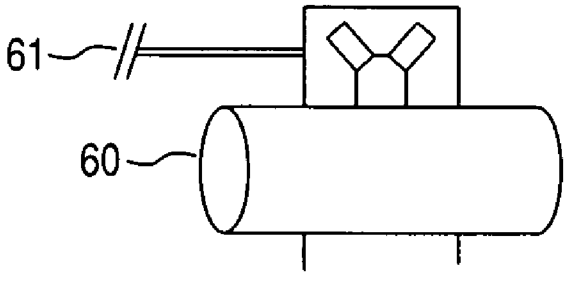
FIG. 4 is a side view of a flow sensor and an actuator according to a preferred embodiment of the present invention.
Figure 3:
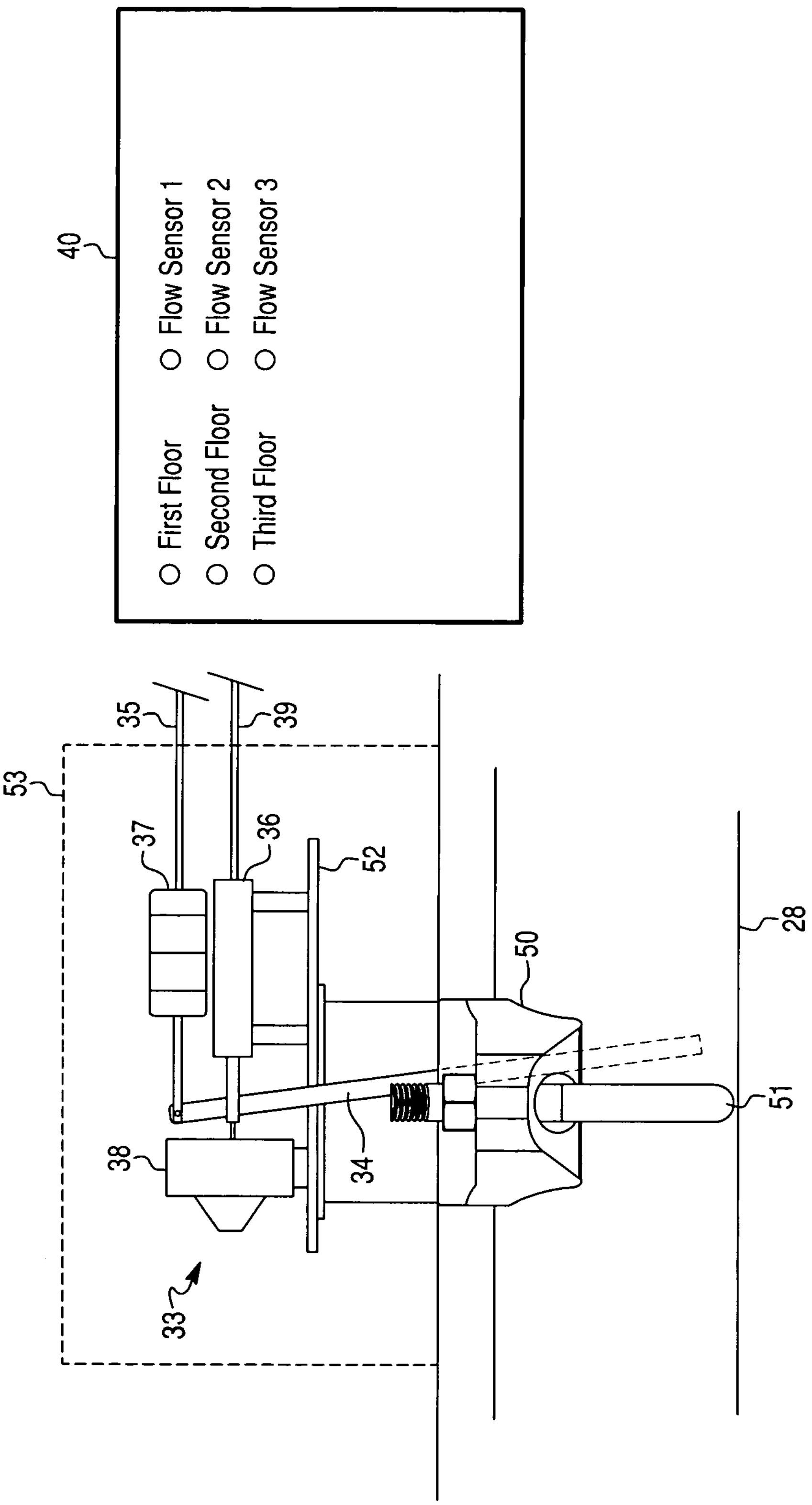
FIG. 3 is a view of a visual display which informs a user of the operation of the sensor and trigger signal according to a preferred embodiment of the present invention.

Although the preferred embodiment discloses the use of a suitable, conventional solenoid switch, other remotely controlled actuators, such as pneumatic switches, may be used in place of the solenoid switch as will be apparent to one skilled in the art upon reading the present specification. As shown in FIG. 4, in the case of using a pneumatic switch 63 a compressor 60 supplies pressurized air via pneumatic connection 61 to operate the pneumatic switch 63.

The principles, preferred embodiments and mode of operation of the present invention have been described in the foregoing specification. However, the invention which is intended to be protected is not to be construed as limited to the particular embodiments disclosed. The embodiments are therefore to be regarded as illustrative rather than as restrictive. Variations and changes may be made without departing from the spirit of the present invention. Accordingly, it is expressly intended that all such equivalents, variations and changes which fall within the spirit and scope of the present invention as defined in the claims be embraced thereby.

What is claimed is:

1. An arrangement for testing a fire suppression sprinkler system, comprising:

a conduit for supplying a flow of fire suppression fluid to at least one sprinkler;

a sensor configured to sense the flow of the fire suppression fluid to the at least one sprinkler, the sensor having a first condition indicative of a predetermined flow of the suppression fluid to the at least one sprinkler and a second condition indicative of a flow of the fire suppression fluid to the at least one sprinkler less than the predetermined flow;

an actuator for selectively causing the sensor to be in the first condition or the second condition independent of the flow of the fire suppression fluid sensed by the sensor; and a signaler for providing an indication to a user that the sensor is in at least one of the first condition and the second condition.

2. The arrangement of claim 1 wherein the actuator is controlled remotely.

3. The arrangement of claim 1 wherein the actuator comprises a solenoid.

4. The arrangement of claim 1 wherein the actuator comprises a pneumatic switch.

5. The arrangement of claim 1 wherein the fire suppression fluid is water.

6. The arrangement of claim 1 wherein the sensor, the actuator and the signaler are provided with a cover.

7. The arrangement of claim 1, further comprising a damper for controlling movement of the sensor.

8. A sensor for sensing the flow of a fire suppression fluid to at least one sprinkler, comprising;

a paddle which may be in a first condition indicative of a predetermined flow of the suppression fluid to the at least one sprinkler and a second condition indicative of a flow of the fire suppression fluid to the at least one sprinkler less than the predetermined flow;

an actuator for selectively causing the paddle to be in the first condition or the second condition independent of the flow of the fire suppression fluid sensed by the sensor; and a signaler for providing an indication to a user that the paddle is in at least one of the first condition and the second condition.

9. The arrangement of claim 8 wherein the actuator is controlled remotely.

10. The arrangement of claim 8 wherein the actuator comprises a solenoid.

11. The arrangement of claim 8 wherein the actuator comprises a pneumatic switch.

12. The arrangement of claim 8 wherein the fire suppression fluid is water.

13. The arrangement of claim 8 wherein the sensor is provided with a cover.

14. The arrangement of claim 8, further comprising a damper for controlling movement of the paddle.

* * * * *